United States Patent
Adams et al.

(10) Patent No.: US 7,103,367 B2
(45) Date of Patent: Sep. 5, 2006

(54) NETWORK-BASED SERVICES FOR MISPLACED CELLULAR MOBILE STATIONS

(75) Inventors: Thomas L. Adams, Austin, TX (US); Timothy P. Schroeder, Austin, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 373 days.

(21) Appl. No.: 10/385,755

(22) Filed: Mar. 12, 2003

(65) Prior Publication Data

US 2004/0180673 A1   Sep. 16, 2004

(51) Int. Cl.
*H04Q 7/20* (2006.01)
*H04M 3/00* (2006.01)

(52) U.S. Cl. ............... 455/456.2; 455/419; 455/420; 455/456.1

(58) Field of Classification Search ............. 455/410, 455/411, 456.2, 558, 419, 420, 456.1
See application file for complete search history.

(56) References Cited

U.S. PATENT DOCUMENTS

| | | | |
|---|---|---|---|
| 4,639,726 A * | 1/1987 | Ichikawa et al. | 340/7.41 |
| 5,635,897 A | 6/1997 | Kuo | |
| 5,677,675 A | 10/1997 | Taylor et al. | |
| 5,862,472 A * | 1/1999 | Park | 455/411 |
| 5,978,668 A * | 11/1999 | Maeda et al. | 455/410 |
| 6,075,456 A | 6/2000 | Park | |
| 6,081,704 A * | 6/2000 | Oshima | 455/410 |
| 6,166,652 A | 12/2000 | Benvenuti | |
| 6,219,556 B1 | 4/2001 | Lee | |
| 6,397,088 B1 | 5/2002 | Roo | |
| 6,606,504 B1 * | 8/2003 | Mooney et al. | 455/567 |
| 6,662,023 B1 * | 12/2003 | Helle | 455/558 |
| 6,741,851 B1 * | 5/2004 | Lee et al. | 455/410 |
| 6,771,954 B1 * | 8/2004 | Yoneyama et al. | 455/420 |
| 6,782,251 B1 * | 8/2004 | Kagay, Jr. | 455/410 |

FOREIGN PATENT DOCUMENTS

| | | |
|---|---|---|
| EP | 1022887 | 7/2000 |
| GB | 2343339 | 5/2000 |
| JP | 6-125305 | 5/1994 |
| JP | 9-182158 | 7/1997 |
| JP | 10-126495 | 5/1998 |
| JP | 2001-69574 | 3/2001 |
| JP | 2002-51109 | 2/2002 |
| JP | 2002-111858 | 4/2002 |

OTHER PUBLICATIONS

English Language Abstract of JP 6-125305.
English Language Abstract of JP 9-182158.
English Language Abstract of JP 10-126495.
English Language Abstract of JP 2001-69574.
English Language Abstract of JP 2002-51109.
English Language Abstract of JP 2002-111858.
A screen-shot of an online document entitled "KX-T7885 cordless 'system' phone," having a copyright date of 1997-2001.
A screen-shot of an online document entitled "MobiNil" and "Customer Service" having an unknown date.
A screen-shot of an online document entitled "Panasonic Dura-Max" having a copyright date of 1999-2002.

* cited by examiner

*Primary Examiner*—Bing Q. Bui
(74) *Attorney, Agent, or Firm*—Greenblum & Bernstein, P.L.C.

(57) ABSTRACT

A feature for a mobile station, wireless network, and method of operating a wireless network for locating a misplaced mobile station and preventing its unauthorized use. The wireless network including a base station. The network and base station transmit a misplaced mobile station signal to a mobile station, causing a misplaced mobile station to ring at high volume, display a text message, emit an audio message, and deactivate normal mobile station functions.

20 Claims, 7 Drawing Sheets

NETWORK-BASED SERVICES FOR MISPLACED CELLULAR MOBILE STATIONS

BACKGROUND OF THE INVENTION

1. Field of the Invention

The present invention relates to the field of telecommunications. More particularly, the present invention relates to base stations, mobile telephone switching offices, mobile stations, and other wireless network systems or devices pertaining to a network based locator feature.

2. Background and Material Information

The use of wireless or mobile communication devices has increased greatly in recent years. Mobile and cellular telephones have enabled mobile station users to roam over large geographic areas while maintaining immediate access to telephony services. Mobile stations include portable units, units installed in vehicles and fixed subscriber stations. Cellular communication systems (wireless carriers) typically provide service to a geographic market area by dividing the area into many smaller areas or cells. Each cell is serviced by a radio transceiver (i.e., a transmitter-receiver base station or cell site). The cell sites or base stations may be connected to Mobile Telephone Switching Offices (MTSOs) or Mobile Switching Centers (MSCs) through landlines or other communication links, and the MTSOs may, in turn, be connected via landlines to the Public Switched Telephone Network (PSTN).

Figure 1:
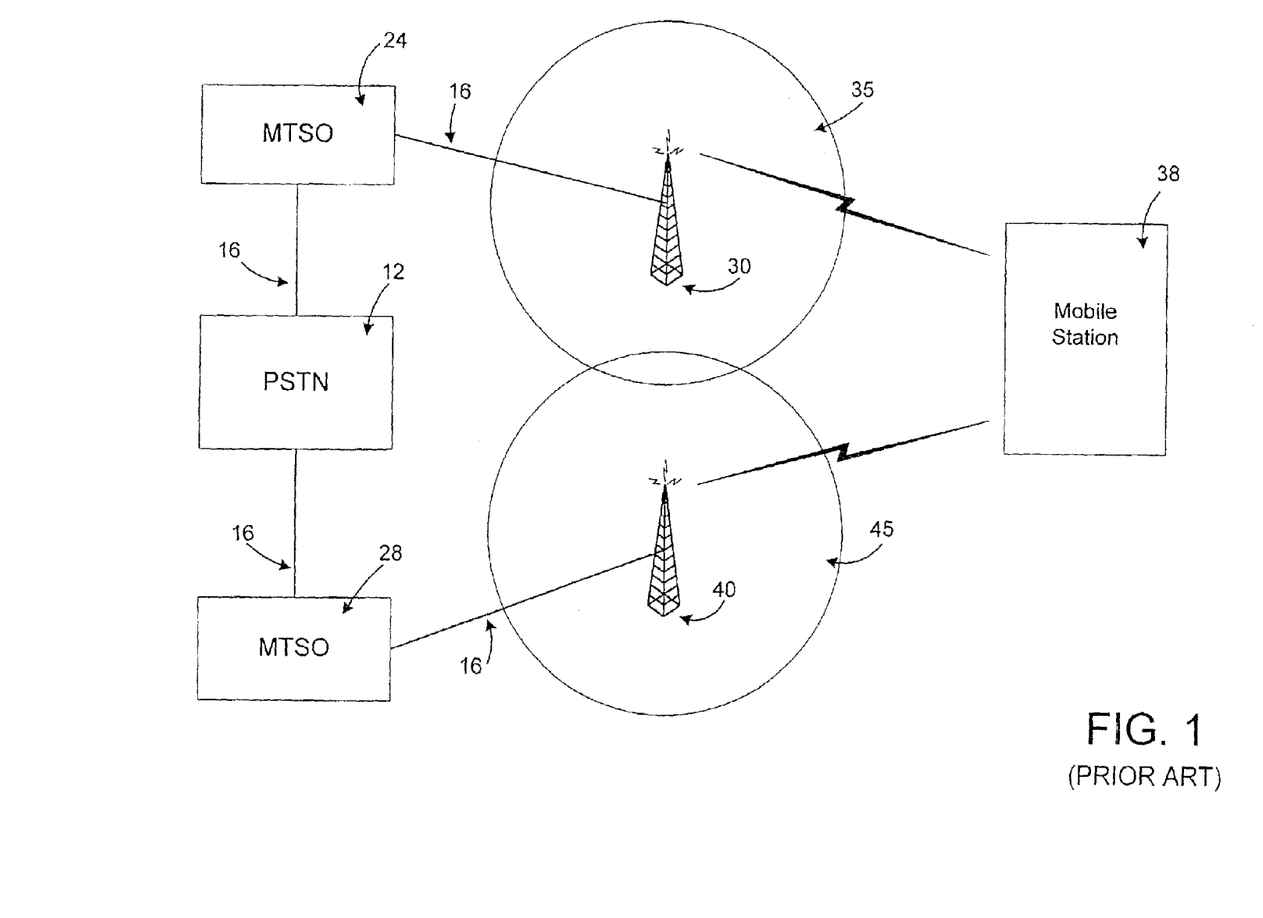
FIG. 1 illustrates the basic components of a conventional cellular network system.

FIG. 1 illustrates the basic components of a conventional cellular network. As shown in FIG. 1, a mobile station 38 may place or receive calls by communicating with a cell site 30 or a cell site 40, depending upon the geographic location of the mobile station and the cell coverage area that is provided by each cell site (i.e., cell coverage area 35 of cell site 30 or cell coverage area 45 of cell site 40). For purposes of illustration, mobile station 38 is depicted in FIG. 1 as being able to communicate with either cell site 30 or cell site 40, even though the mobile station is not illustrated as being located within cell coverage area 35 or cell coverage area 45. Under normal operating conditions, the extent to which mobile station 38 will be able to communicate with cell site 30 or cell site 40 will depend on the geographic location of the mobile station and the size of the cell coverage area of each cell site. Further, although only two cell sites are depicted in FIG. 1, the entire cellular network may include, for example, more than two cell sites. In addition, more than one cell site may be connected to each MTSO 24, 28.

Mobile phones and other wireless communication devices have, in recent years, become smaller and smaller. This decreased size has numerous obvious advantages. However, the smaller size makes the mobile station easier to lose or misplace. Irrespective of size, once an owner has misplaced his mobile station he wants it back. In the past, a mobile phone or other wireless communication device owner would use another phone to call his lost or misplaced device. This would and still works for limited scenarios but is far from perfect. For example, if the mobile station has been set to quiet or silent mode or the mobile station 68 is out of audio range of the owner, then the ringing will be difficult or impossible to hear and the mobile station 68 will thus be hard to find. With the advent of voice mail, the user will also have a limited time in which to hear the call before the mobile station or mobile phone service transfers the call into voice mail. The present invention overcomes these limitations.

3. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

Advanced Intelligent Network (AIN)
Automatic Number Identification (ANI)
Code Division Multiple Access (CDMA)
Complementary Metal Oxide Semiconductor (CMOS)
Customer Service Center (CSC)
Electrically Erasable Programmable Read-Only Memory (EEPROM)
Frequency Division Multiple Access (FDMA)
Global System for Mobile communications (GSM)
Home Location Register (HLR)
Integrated Digital Enhanced Network (IDEN)
Interactive Voice Response (IVR)
Mobile Identification Number (MIN)
Mobile Telephone Switching Offices (MTSOs)
Mobile Switching Centers (MSCs)
Over the Air Activation (OAA)
Over the Air Programming (OAP)
Over the Air Activation Function (OTAF)
Personal Access Communications System (PACS)
Personal Communications Services (PCS)
Personal Digital Assistants (PDAs)
Personal Identification Number (PIN)
Public Switched Telephone Network (PSTN)
Random Access Memory (RAM)
Service Control Point (SCP)
Short Message Peer-to-Peer (SMPP) protocol
Short Message Service (SMS)
Short Message Service Center (SMSC)
Service Switching Point (SSP)
Terminating Attempt Trigger (TAT)
Transmission Control Protocol/Internet Protocol (TCP/IP)
Time Division Multiple Access (TDMA)
Universal Resource Locator (URL)

DESCRIPTION OF THE DRAWINGS

The present invention is further described in the detailed description that follows, by reference to the noted drawings by way of non-limiting examples of embodiments of the present invention, in which like reference numerals represent similar parts throughout the several views of the drawings.

DETAILED DESCRIPTION OF THE INVENTION

In view of the above, the present invention through one or more of its various aspects and/or embodiments is presented to accomplish one or more objectives and advantages, such as those noted below.

In accordance with an object of the present invention, a mobile station with a network based cellular mobile station locator feature has a transceiver for receiving cellular communications and misplaced mobile station signals. The mobile station includes a speaker, a display, a keypad, and a control system for operating the speaker at high volume when the transceiver receives a misplaced mobile station signal. The mobile station further displays a message on the display when the transceiver receives the misplaced mobile station signal. Additionally, the mobile station may prevent the transceiver from receiving and/or transmitting cellular communications when the transceiver receives the misplaced mobile station signal. Thereafter, the control system further allows the transceiver to receive and transmit cellular communications after a personal identification number (PIN) is entered into the keypad. The mobile station can further include a storage that stores an indicator that a missing mobile station signal has been previously received regardless of power loss. Furthermore the control system can operate the speaker to emit an audio message. The control system can stop operating the speaker after a key on the keypad is pressed. Finally, the control system further stops operating the speaker after a predetermined time elapses or battery level has been reached.

It is a feature of the present invention to have a method of operating a wireless network for locating a misplaced mobile station that includes transmitting a misplaced mobile station signal to a mobile station while avoiding interaction of a voice mail feature of the network, and ringing the misplaced mobile station at a high volume. The method further includes displaying a message on a display of the mobile station. The message on the display can provide instructions for returning the mobile station and/or contacting customer service. The method further includes preventing communications from and/or to the mobile station. Additionally, the method includes playing an audio message on the mobile station indicating that the mobile station is misplaced. The method can further include the misplaced mobile station signal being a short message service (SMS) message, a data signal, a voice call from a special calling number, an email, or a text message. The method further includes stopping the ringing when a personal identification number (PIN) is communicated to the network. Finally, the method may include stopping the ringing after a predetermined time or battery level.

In accordance with another aspect of the invention, a wireless network system including a network for initiating communication signals and initiating a misplaced mobile station signal, and a base station for transmitting the communication signals and transmitting the misplaced mobile station signal. Transmitting the misplaced mobile station signal by the wireless network avoids interaction with a network voice mail feature. The wireless network further transmits the misplaced mobile station signal to display a message on a display of a mobile station. Additionally, the network or the base station further prevents mobile station calls from being made to and/or from the mobile station after transmitting the misplaced mobile station signal. The system further transmits the misplaced mobile station signal to play an audio message at the mobile station. The wireless network further transmits the misplaced mobile station signal as a text message, a data signal, a voice call from a special calling number, an email, or a short message service (SMS) message. The system displays the message on the display to provide instructions for returning the mobile station or contacting customer service. Finally, the wireless network system in which the base station transmits the misplaced mobile station signal to ring a misplaced mobile station at a high volume.

According to an aspect of the present invention, an apparatus is provided for helping a user find a misplaced mobile phone or other mobile communication device.

In another aspect of the present invention, an apparatus is provided for helping a user find a misplaced mobile phone or other mobile communication device by avoiding interaction with a voice mail feature.

In an additional aspect of the present invention, an apparatus is provided for helping a user find a misplaced mobile station via another phone or customer service phone number.

In another aspect of the present invention, an apparatus is provided for helping a user find a misplaced mobile station by sending a signal, text messaging data, special email message, call from a special number recognized at the handset using automatic number identification (ANI) information, or Short Message Service (SMS) message.

In yet another aspect of the present invention, an apparatus is provided for helping a user find a misplaced mobile station by sending signal, to make a mobile phone or other mobile communication device ring or emit sound at the highest possible volume, regardless of any prior settings, and display a message on the LCD.

The present invention relates to a device capable of using or having a network based cellular mobile station locator feature and the network that implements the cellular mobile station locator feature. It is possible that the preferred system is defined and/or selected according to a required or preferred air-interface technology (e.g., TDMA, CDMA, PACS, GSM and PCS-1900) to be utilized by the mobile station. Additionally, according to another aspect of the present invention, programming of the network based cellular mobile station locator feature in the mobile station may be performed over-the-air (i.e., by wireless communication) to permit easy reprogramming of the mobile station.

FIGS. 2–4 and 6 illustrate an exemplary network architecture and exemplary system components for implementing the intelligent network based cellular mobile station locator feature capabilities of the present invention.

Figure 2:
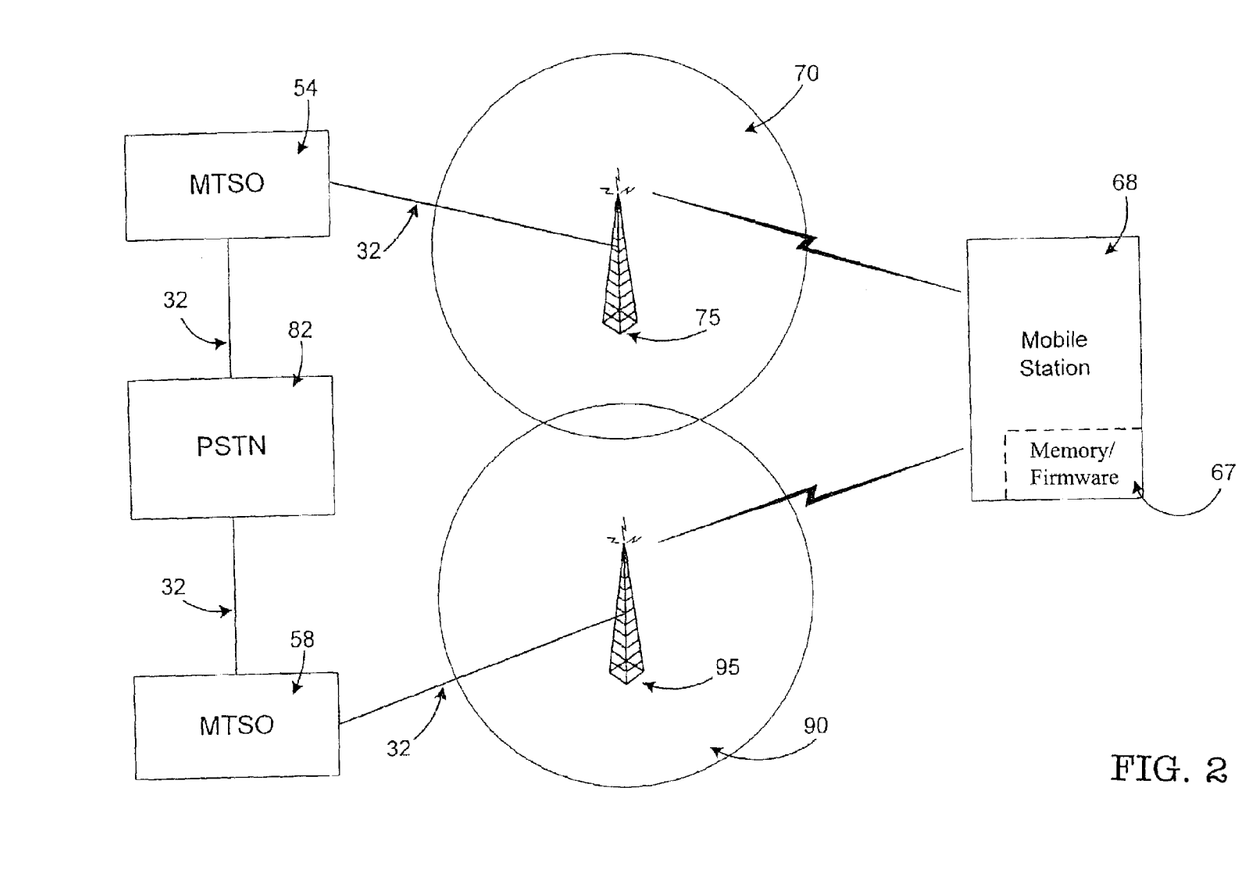
FIG. 2 illustrates exemplary components of a cellular or PCS network system implemented according to aspects of the present invention.

In FIG. 2, exemplary components of a cellular network implemented with the features of the present invention are illustrated. In FIG. 2, a mobile station 68 is provided with a network based cellular mobile station locator feature 67. According to an aspect of the present invention, the network based cellular locator feature may be preprogrammed into the mobile station 68 prior to activation of the unit and/or may be reprogrammed and updated by using, for example, a physical interface (such as a computer interface) or over-the-air programming techniques, such as those discussed below.

The mobile station 68 may comprise portable phone units, units installed in vehicles and fixed subscriber units. By way of non-limiting example, the mobile station 68 may be implemented as a cellular telephone unit with a transceiver and antenna (see, for example, FIGS. 3 and 4) to communicate by, for example, radio waves with one or more cell sites. The present invention can be utilized in Personal Digital Assistants (PDAs) and other wireless communication devices.

In FIG. 2, multiple cell sites 75 and 95 are illustrated. The mobile station 68 may place or receive calls by communicating with a cell site 75 or 95, depending upon the location of the mobile station 68 and the cell coverage area that is provided by each cell site. That is, when mobile station 68 is located within cell coverage area 70 it may communicate with cell site 75, and when it is located within cell coverage area 90 it may communicate with another cell site 95. As will be appreciated by those skilled in the art, the actual cell coverage area for a cell site will depend upon various factors, including the power of the transceiver of the cell site, the placement and location of the cell site, and the topography of the surrounding areas where the cell site is located. Further, although only two cell sites are depicted in FIG. 2, the cellular network may of course include more than two cell sites. Moreover, it should be noted that the various components of the cellular network depicted in FIG. 2 are provided for the purpose of illustration only, and that other types of network arrangements may of course be provided to implement the features of the invention. In addition, more than one cell site may be served by each MTSO.

Various air-interface technologies (e.g., TDMA, CDMA, PACS, GSM, IDEN, and PCS-1900) may be utilized to facilitate communication between the mobile station 68 and the cell sites. Each of the cell sites 75 and 95 may include, for example, a radio transceiver (not shown) and may be connected by landlines 32 or other communication links to Mobile Switching Centers (MSCs) or Mobile Telephone Switching Offices (MTSOs) 54 and 58. Landlines 32 may also be utilized to connect the MTSOs 54 and 58 to the Public Switched Telephone Network (PSTN) 82. The MTSOs 54 and 58 may also be connected to a Short Message Service Center (SMSC) (not shown in the drawings) to facilitate the delivery of short messages to a mobile station 68.

The MTSOs 54 and 58 may be conventional digital telephone exchanges that control the switching between the PSTN 82 and the cell sites 75 and 95 to provide wireline-to-mobile, mobile-to-wireline and mobile-to-mobile call connectivity. The MTSOs may provide various functions, including (i) processing mobile station status data received from the cell site controllers, (ii) handling and switching calls, (iii) processing diagnostic information, and (iv) compiling billing information. The transceiver (not shown) of each cell site 75 and 95 may provide communication services, such as voice and data communication, with mobile station 68 while it is present in its cell coverage area. Tracking and switching of the mobile station 68 from cell site to cell site may be handled by the MTSOs, as the mobile station 68 passes through various cell coverage areas. When, for example, a mobile station 68 passes from one cell to another cell, the MTSO of the corresponding cell may perform a "hand-off" that allows the mobile station 68 to be continuously serviced if on a voice or data call.

Figure 3:
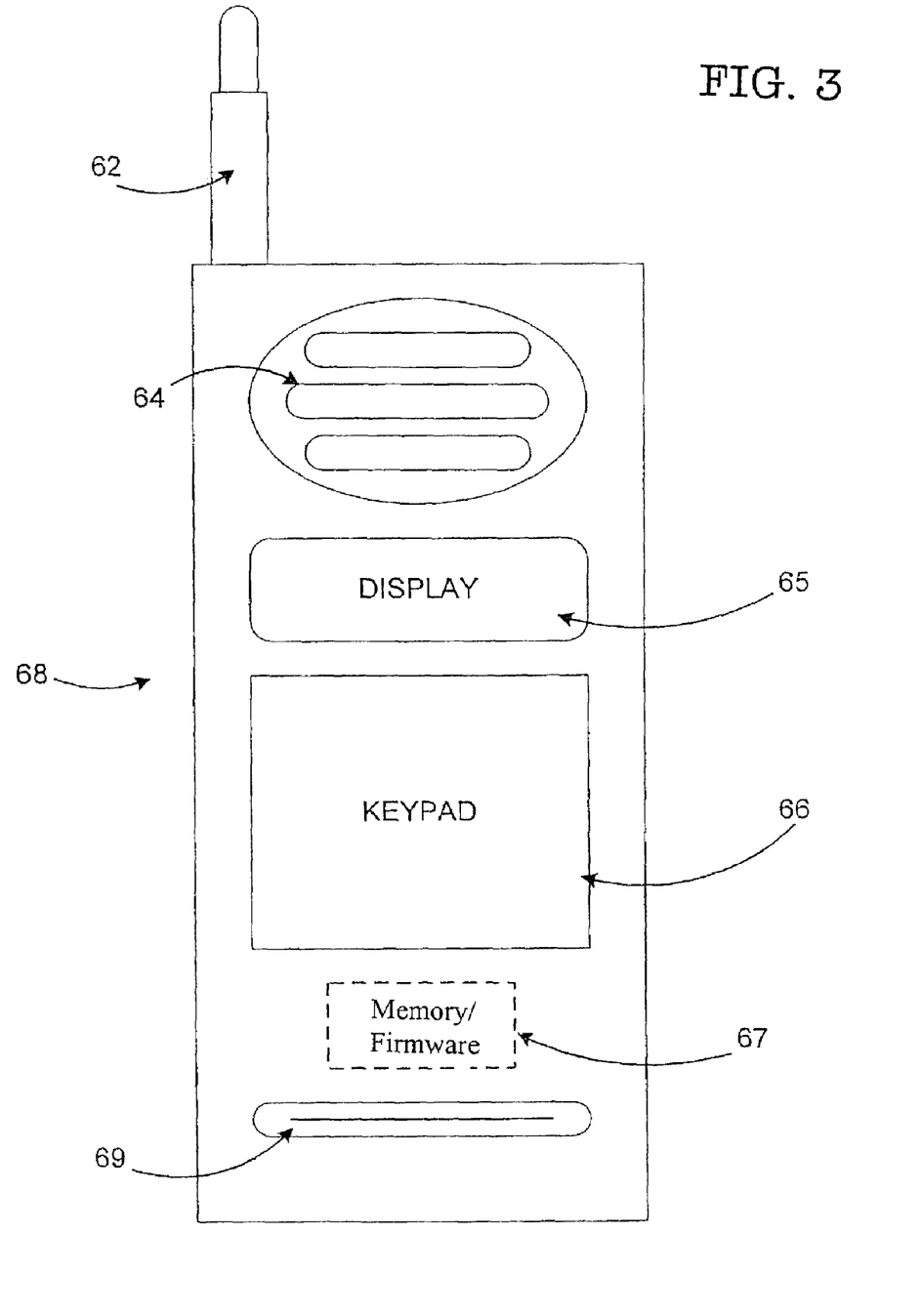
FIG. 3 illustrates, in accordance with an aspect of the present invention, an exemplary mobile station implemented as a wireless phone unit.

As shown in FIG. 3, the mobile station 68 may be implemented as a cellular or wireless phone unit that comprises an antenna 62, a speaker 64, a microphone 69, a display 65, and a keypad 66 for entering alphanumeric information. The phone unit of the mobile station 68 may be constructed in a similar fashion to that of a conventional cellular telephone, with the exception of unique programming, memory configurations, or other contents for implementing the network based cellular mobile station locator feature 67. Further, the feature 67 of the mobile station 68 may be a memory configured to handle a greater capacity than that of a conventional cellular telephone, in order to accommodate the network based cellular mobile station locator feature 67 and other operational information of the present invention. In the alternative, the locator feature can be stored in the standard memory of a mobile station 68.

Reception of the signal can be accomplished in conjunction with the controller 61 or by the controller 61 in conjunction with the locator feature 67. The locator feature 67 can take the form of firmware that is factory installed. This firmware is programed as described in more detail below. The feature can alternatively be part of the controller 61, or can take the form of a stored program. In any of these forms, the described process can operate with the mobile station operating system in order to practice the invention.

In one possible embodiment, the locator feature 67 is implemented as firmware. The firmware can be factory installed. In the alternative the firmware can be added to the system after the user has purchased the phone.

Portion 67 is the network based cellular mobile station locator feature of the mobile station 68 that will implement the network based cellular locator feature and other functional information of the present invention. Portion 67 may take the form of programmed logic, firmware, or memory. The memory may include a read-write memory device that has an independent power supply so the contents will not be effected by power downs of ordinary duration. By way of non-limiting examples, the memory may be implemented by a programmable Electronically Erasable Programmable Read Only Memory (EEPROM), a Complimentary Metal Oxide Semiconductor (CMOS) memory chip, or a conventional Random Access Memory (RAM) with an independent power supply.

Reception of the signal can be accomplished in conjunction with the controller 61 or by the controller 61 in conjunction with the locator feature 67. The locator feature 67 can take the form of firmware that is factory installed. This firmware is programed as described in more detail below. The feature can alternatively be part of the controller 61, or can take the form of a stored program. In any of these forms, the described process can operate with the mobile station operating system in order to practice the invention.

Figure 4:
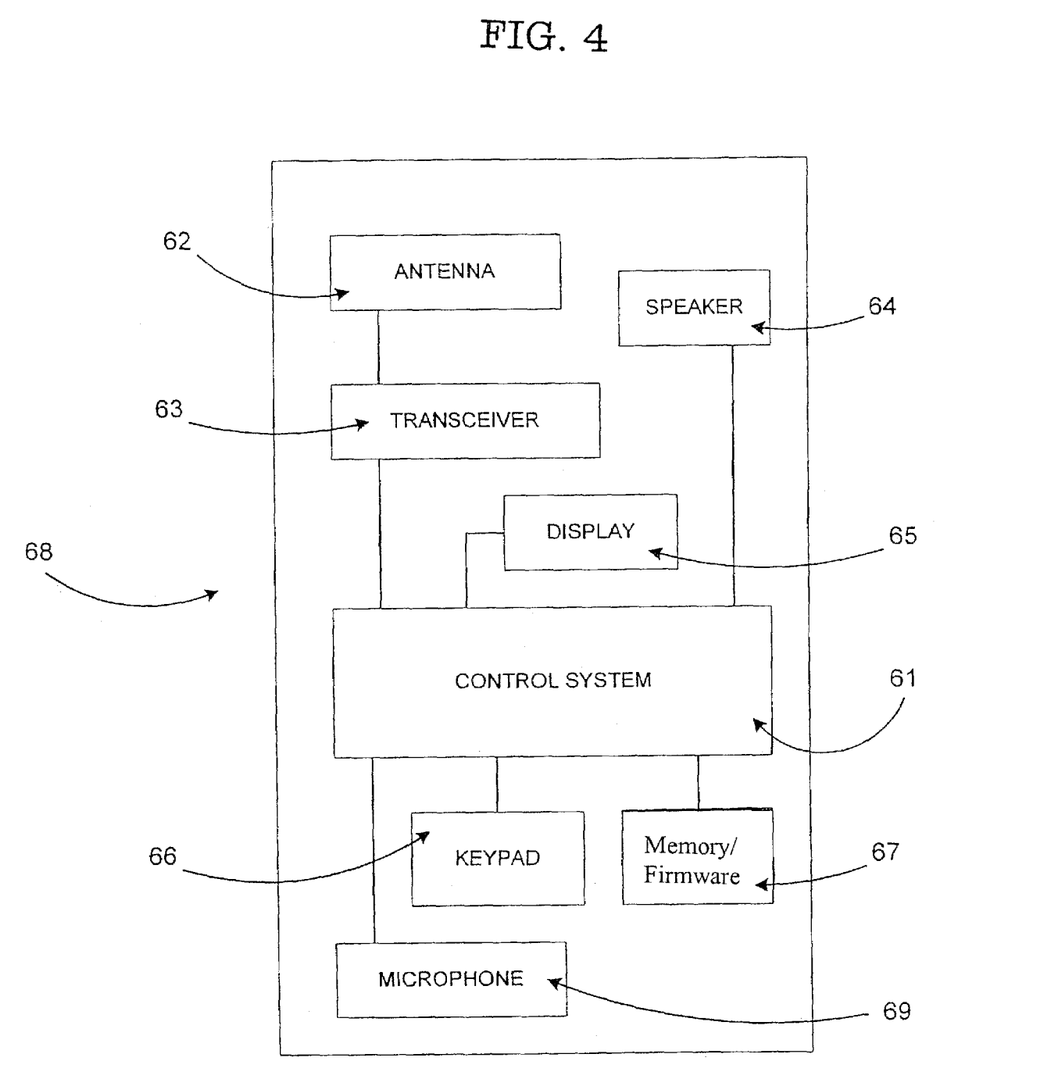
FIG. 4 is a general block diagram of the components of the mobile station of FIG. 3, in accordance with an aspect of the present invention.

An exemplary block diagram representation of the components of the mobile station 68 are depicted in FIG. 3 and FIG. 4. As discussed above, the cellular telephone unit of the mobile station 68 may include an antenna 62, a speaker 64, a display 65, a keypad 66, and a microphone 69. The antenna 62 may be connected to a transceiver 63, which in turn is connected to a control system 61. The control system 61 may be implemented as a microprocessor-based, control system and may be programmed to carry out the features and logic of the present invention. The programming of the control system 61 may be carried out by any suitable combination or use of software, hardware and/or firmware. Control system 61 may control the various components of the mobile station 68 to permit a user to send and receive calls and program the mobile station 68. In addition, control system 61 may have access to a portion 67, in which the network based cellular locator feature and other programming information is stored, for directing operation of the mobile station 68. A more detailed description of the various processes and functions of the present invention, as well as the logic steps associated with the network based cellular mobile station locator feature 67, is provided below with reference to the accompanying drawings.

According to an aspect of the invention, after a user unintentionally misplaces his mobile station 68, he can contact his wireless service provider network or network to indicate that the mobile station 68 has been misplaced. The network will subsequently send a misplaced mobile station signal in one of numerous formats. The misplaced mobile station signal will then trigger the mobile station 68 to enter a misplaced mobile station mode. The details of each of these concepts will be described in detail below.

After a user loses or misplaces his mobile station 68, the user can request that a misplaced mobile station signal be sent to help locate his mobile station 68. The user has to first make it known that the mobile station 68 has been misplaced. This can be done by contacting a customer service center 102; notifying the network through a phone number that is common to all users that will connect the user to an interactive voice response (IVR) system; notifying the network through the user's mobile station voice mail system; contacting the network through an Internet world wide web page; contacting the network through email; or sending an email or text message directly to the misplaced mobile station 68. However, it should be known that any method of contacting the network to make it known that the mobile station 68 has been misplaced and that a misplaced mobile station signal needs to be sent is within the spirit and scope of the invention.

In the first alternative, a user contacts a customer service center 102 to initiate the misplaced mobile station signal. Typically, a mobile service provider has a customer service center 102 that includes customer service personnel that provide a plurality of functions. These customer service personnel can be trained to interact with customers to initiate the misplaced mobile station signaling. These personnel, after being contacted by the user of the misplaced mobile station, can then launch the lost mobile station signal in one of the many formats described below.

In yet another alternative, the user notifies the network through the user's mobile station phone number that will connect the user to an Interactive Voice Response (IVR) system in conjunction with the mobile station's voice mail feature. One possible implementation would include using an IVR as used with a voice mail system. The IVR would include an additional branch in the IVR logic. A subscriber who has lost his mobile station 68 would reach his voice mail system as usual, either by calling a general access number or by calling his own mobile station number and pressing a special key sequence to log in to his voice mail. While logged in, the user would have the ability to enter a "lost handset" branch of the voice mail system's IVR through an IVR menu selection. Once in the "lost handset" branch, the voice mail system would confirm that the user desires to send a lost mobile station signal, and then send the lost mobile station signal in one of the many formats described below.

In another alternative, the user notifies the network through a common phone number which is common to all users, such as a 800 number. That common phone number will have an associated terminating attempt trigger (TAT) that will cause a service switching point (SSP) associated with this phone number to query a service control point (SCP). The SCP runs an advanced intelligent network (AIN) service that will connect the user to an interactive voice response (IVR) system. Once connected to the IVR, the subsequent IVR interaction would allow the user to enter a "lost handset" branch of an IVR provided menu. Once in the "lost handset" branch, the IVR would collect information and confirm that the user desires to send a lost mobile station signal, and then send the lost mobile station signal in one of the many formats described below. For example, the IVR would take information that has been collected from the user, such as the mobile station's phone number, and return it to the SCP. The SCP can then direct the SSP to connect the user directly to the mobile station 68. In this case the SCP would direct the SSP to change the originating number of the user to a special number which the mobile station 68 would recognize. This special number would cause the mobile station 68 enter into lost mobile station mode. In another example, the IVR would return the information collected from the user to the SCP. The SCP would then create a SMS message that would instruct the mobile station to enter lost mobile station mode.

Another alternative can include contacting the network through an Internet world wide web page (not shown). The user would, through the use of an Internet browser, enter a specific universal resource locator (URL) or web address that would subsequently load an Internet web page. This page could be the service provider's home page or a special misplaced mobile station home page. The web page could further include hyper-links to guide the user to a specific page that would allow the user to enter data. The data can include, for example, the misplaced mobile station's phone number. Once the user has completed entering data into the web page, the web page can provide the user with confirmation of its completion. The data is subsequently forwarded to the network to initiate the misplaced mobile station signal in one of the many formats described below.

Yet another alternative can include initiating the misplaced mobile station signal through an email message. The user after misplacing the mobile station 68 can send an email to a specific email address (i.e. lostphone@company.com) that has been created for the specific purpose of initiating a misplaced mobile station signal. The email can be transmitted with the appropriate identifying information. The email can then be reviewed by customer service personnel, these customer service personnel can be trained to review the email and to initiate the misplaced mobile station signaling. These customer service personnel can thereafter launch the lost mobile station signal in one of the many formats described below. As another alternative, the misplaced mobile station process can be initiated directly by the user emailing or text messaging his mobile station 68. More specifically, after the user has misplaced his mobile station 68 he can initiate the misplaced mobile station signal by directly emailing or text messaging his mobile station with a special message that can be interpreted as a misplaced mobile station signal. For example, the user can use any device that has the capability to compose emails or text messages for this process. This email or text message can include any combination of one or more words, alpha-numeric characters, and/or spaces, that will indicate that it is a misplaced mobile station signal. This email or text message will then be sent to the misplaced mobile station. In an alternative, the email from the subscriber can be processed by an automatic program which can itself initiate the lost mobile station signal in one of the many formats described below, without the intervention of a customer care representative.

In each of these alternatives described above, some form of account number, full or partial social security number, or a special personal identification number (PIN) can be used to authenticate the user. Authenticating the identity of the user is optional, but may be desired to avoid possible abuse of the system. The manner of identification does not have to be limited to the above, but can take any known method.

Although several specific examples have been discussed, any form of communication to the network, that is sufficient to initiate a misplaced mobile station signal (for example, to launch a trigger causing the SCP to initiate the signal) is within the scope and spirit of the present invention.

Once the network has received the misplaced mobile station request from the user and optionally authenticated the identity of the misplaced mobile station message user, the misplaced mobile station signal may be sent. The misplaced mobile station signal takes the form, for example, of either a text message, data signal, email, SMS message, or a call from a designated originating number which would be detected at the mobile station 68 using normal detection of originating numbers. The only requirement for each of these signals is that some part of the signal is unique and identifies it as a misplaced mobile station signal. For example, with a text message, email, or a SMS message, the contents of each of these messages that would normally be text is replaced with a unique set of data that the mobile station 68 would recognize as a misplaced mobile station signal.

More specifically, the misplaced mobile station signal could be a SMS message, the contents of the SMS message identifying the SMS message as a misplaced mobile station signal. The use of a SMS message as a type of misplaced mobile station signal is useful because SMS is already nationally installed by most carriers, and is already used for other special purpose text messages, such as those that turn on the message indicator, and provide inventories of unheard messages.

Alternatively, the misplaced mobile station signal can be a call from a special phone number. The mobile station would recognize the special phone number using the automatic number identification (ANI) information. This special phone number and hence specific associated ANI information would be recognized by the mobile station 68 as a misplaced mobile station signal.

Once the network initiates the misplaced mobile station signal, the signal is routed through the network in any of the various noted formats. The misplaced mobile station signal will be routed to the appropriate MTSO 54 or 58 where it will be transmitted via the appropriate base station 75 or 95 to the misplaced mobile station 68. The manner in which the misplaced mobile station signal is routed and transmitted can be substantially similar to the manner in which any wireless communication is routed through a wireless network.

It should be further noted that it is within the scope of this invention to use any combination contacting the network, described above, with any misplaced mobile station signal format, described above.

Figure 5:
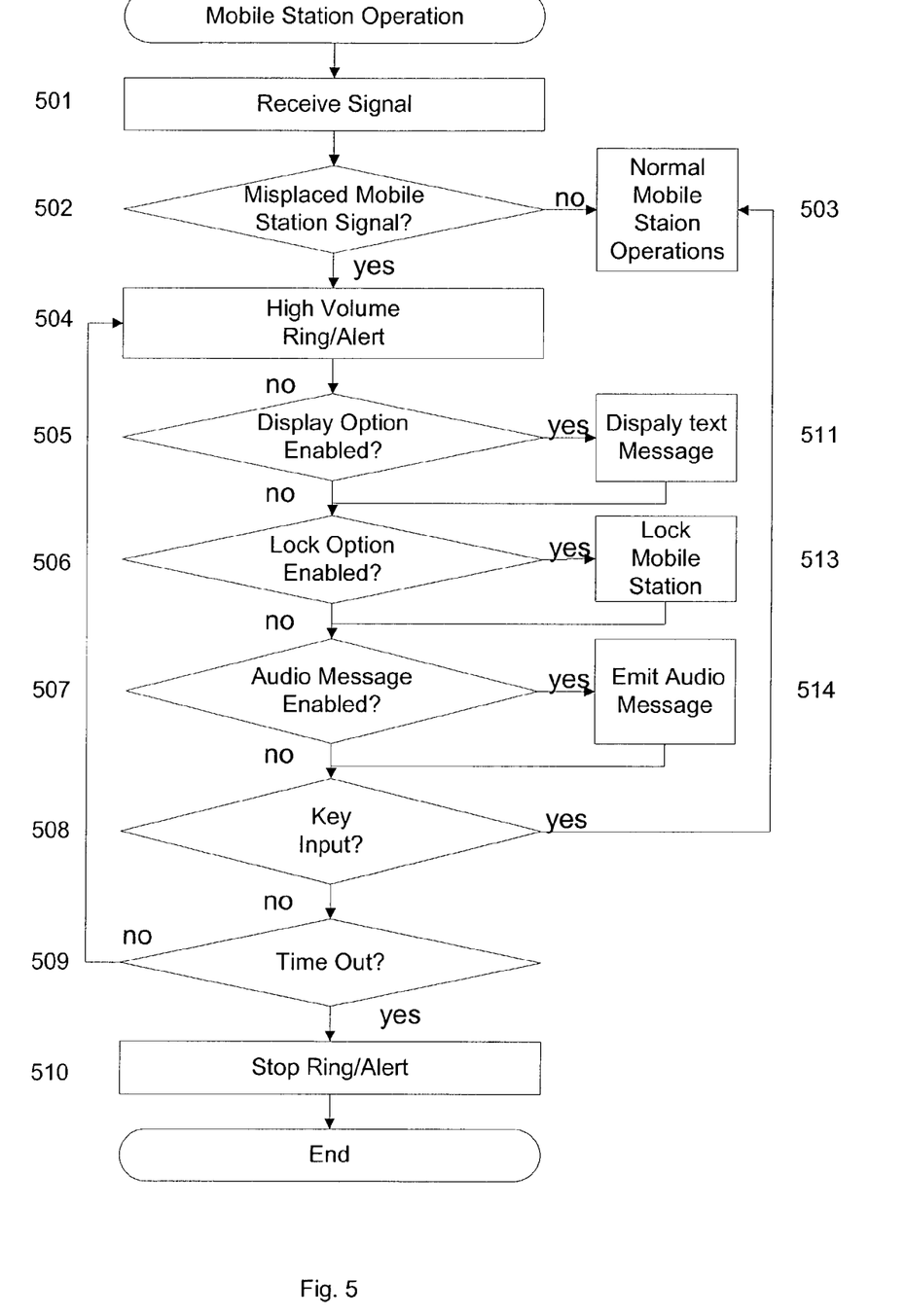
FIG. 5 is a flow diagram of the processes and operations of an aspect of the present invention.

Referring now to FIG. 5, an exemplary logic flow diagram of operation of the network based cellular mobile station locator of the present invention will be discussed, in accordance with an embodiment of the present invention. The various processes and operations illustrated in FIG. 5 may be carried out by a control system 61 of the mobile station 68 through the use of programmed logic, memory, or firmware. Although the description below is made with reference to a cellular network environment, the various processes and operation may also be applied to any other type of wireless communication network.

The processing in the mobile station 68 when a misplaced mobile station signal is received will now be described. At step 501 the mobile station 68 will receive a communication with the transceiver 63. This communication could be any one of numerous different types of communication such as phone calls, text messages, Short Messages Service (SMS) messages, etc. One of these received signals can be, based on its content, a misplaced mobile station signal.

At step 502, the controller of the mobile station 68 will determine if the received communication is a misplaced mobile station signal or some other normal communication signal. As described above, the misplaced mobile station signal can be for example, a specific text message, data signal, email, a call from a special number recognized at the handset using ANI information, or a SMS message.

Optionally, in step 502 the mobile station 68 can additionally store an indication in memory 67 that it has received a misplaced mobile station signal. The indication is stored such that, if the phone loses power and has power restored, the indication will not be lost. During normal power-up initialization, the mobile station 68 could check to see if the indication exists and thus determine if a misplaced mobile station signal was previously received. The mobile station 68 would then directly enter the lost phone mode, at for example step 502, and not allow normal operation until further action was taken. Once the mobile station 68 is found, the indication can be deleted or removed from memory. This indication can be stored in a non-volatile memory in the mobile station 68.

If, for example, the signal is a normal communication signal, then the flow of logic will move to step 503 where the mobile station 68 will commence normal mobile station operations. The normal communication signals can be conventional voice, data, facsimile, text message, SMS message, etc. If, on the other hand, the received signal is recognized as a misplaced mobile station signal then the flow of logic will move to step 504 and the mobile station will enter misplaced mobile station mode.

Conventionally, preferences, including ringing or alert preferences, of the mobile station 68 may be set by the user. For example, the mobile station 68 can be set to ring at a very low volume or to not ring at all. In the latter instance, the mobile station 68 may be set to just vibrate. However, in response to receiving the misplaced mobile station signal, at step 504 the mobile station 68 will bypass the set preferences and start to ring or alert at a high volume. The preferred setting of quiet ring or no ring will not be used. In one embodiment, the high volume ring or alert sound is also continuous.

It should be noted that for a misplaced mobile station signal that is either a specific text message, data signal, email, or a SMS message, any voice mail feature associated with the mobile station 68 may be avoided because this misplaced mobile station signal is not a normal voice call that would trigger voice mail. Thus after for example three rings, control will not be relinquished to voice mail, or any similar feature intended to be involved in normal call processing. Consequently, any mobile station 68 is able to ring for a longer period of time helping the owner or anyone close by to find the mobile station 68.

On the other hand, if the misplaced mobile station signal is a call from a special number, then the voice mail feature associated with the phone number of the misplaced mobile station 68 may take control of the call after, for example, three rings. However, the mobile station 68 will have had time to recognize the special calling number as a misplaced mobile station signal and will have entered misplaced mobile station mode.

For the implementation of the invention, high volume is considered to be any volume setting that allows the device to be heard by the user and should not be limited to any particular volume setting. High volume can include the highest or loudest setting, but can also include lower and mid-range volume settings.

It should be appreciated that the logic as described in steps 504 to 510 is different than the processing for normal incoming phone calls. Steps 505–507 include optional features that may be used with the present invention. These features can be enabled as part of the misplaced mobile station locator feature 67 or they can be skipped.

At step 505, it determined if the optional display message capability is enabled. If it is, then mobile station 68 can display an optional message at step 511. The optional message can take several different forms. For example, the message can give directions for returning the mobile station 68 and or ending the ringing or alert sound. The directions for returning can include a phone number of the customer service center 102, an alternative phone number that can be used to contact the mobile station owner, or mailing directions. The message can provide other details, such as a reward for the return of the lost mobile station 68. The message may be pre-set or can be designated in the misplaced mobile station signal.

In one embodiment, after the misplaced mobile station signal is received, no other transmission can be received or transmitted with transceiver 63. This can reduce energy consumption and hence increase battery life. For example, in step 506, it is determined if the lock feature has been enabled. If this feature is enabled, then the use of the mobile station 68 may be optionally locked at step 513. The locking of the mobile station 68 can be with respect to either incoming calls, outgoing calls or both. The locking of the mobile station 68 may be accomplished either at the network level as initiated by the network or by the controller 61 or some other operative portion of the mobile station 68. Locking the use of the mobile station 68 serves several purposes. It reduces the possibility that the mobile station 68 will be used by unauthorized users. It also encourages the finder of the misplaced mobile station 68 to return the mobile station 68. Finally, the mobile station 68 will be less likely to be taken due to that fact that the mobile station 68 can be quickly and easily rendered inoperable.

Next in step 507, it is determined if an audio message feature is enabled. If this feature is enabled, then an optional audio message can be emitted from the audio speaker 64 in step 514. The message can give instructions on what to do with the mobile station 68. In the alternative, the audio message can merely indicate that this is a misplaced mobile station. It should also be noted that the audio message can be in lieu of the step 504 ring/alert or in addition to the ring alert. Also, the audio message can be set to be activated after any key on the keypad 66 is depressed.

At step 508, the high volume ring, optional message, and optional lock-out may be canceled and the mobile station 68 can be returned to normal mobile station operations by key input on keypad 66. The key input can take the form of pressing any key or in the alternative, for higher security, by entering a personal identification number (PIN). The use of the PIN could help ensure that the mobile station 68 is returned and not used by someone unauthorized, as described above. Furthermore, both features can be implemented. For example, pressing any key can end the optional high volume ringing and the optional audio message only. The optional message and optional lockout would remain until the PIN has been entered.

In step 509, the length of time that the mobile station 68 has been ringing or alerting at high volume may be optionally tracked. This may be implemented for example by a counter that is incremented or decremented during each loop of the logic. In the alternative, a timer may increment or decrement based on an actual time. When the count or time reaches a certain point, the logic will advance to step 510. The purpose of optionally tracking the time is to avoid draining the battery to the extent that the display will no longer function to display a message and/or the speaker will no longer function to emit the ringing or audio message. Additionally, mobile station 68 may, in an effort to conserve battery strength and maximize the possibility of discovery, schedule periodic occasional ringing rather than immediately performing sustained ringing.

If at step 509 there is still time or count left, the logic will return to step 504. Otherwise the logic will flow to step 510.

In yet another embodiment of step 509, the battery level may be monitored. When the battery voltage level reaches a certain point, the logic will advance to step 510. The battery life can be monitored by any known conventional manner. If at step 509 there is enough battery life left, the logic will return to step 504. Otherwise the logic will flow to step 510.

Once at step 510, the ringing or alert sound will be stopped. However, the optional display messages can continue to be displayed and the mobile station 68 can continue to be locked from incoming and outgoing calls. Although not shown, key input similar to that described for step 508 can be input to allow the mobile station 68 to return to normal operation.

In order to provide increased flexibility, programming and downloading of the network based cellular locator feature 67 may be performed over-the-air. In accordance with an aspect of the present invention, over-the-air programming of the network based cellular locator feature 67 allows the cellular locator feature to be initially downloaded and/or updated to the mobile station 68 without requiring the user to bring the mobile station 68 into a service center. The over-the-air programming capability of the present invention provides several advantages, including improving the ease by which the mobile station 68 can be programmed with the new feature.

Figure 6:
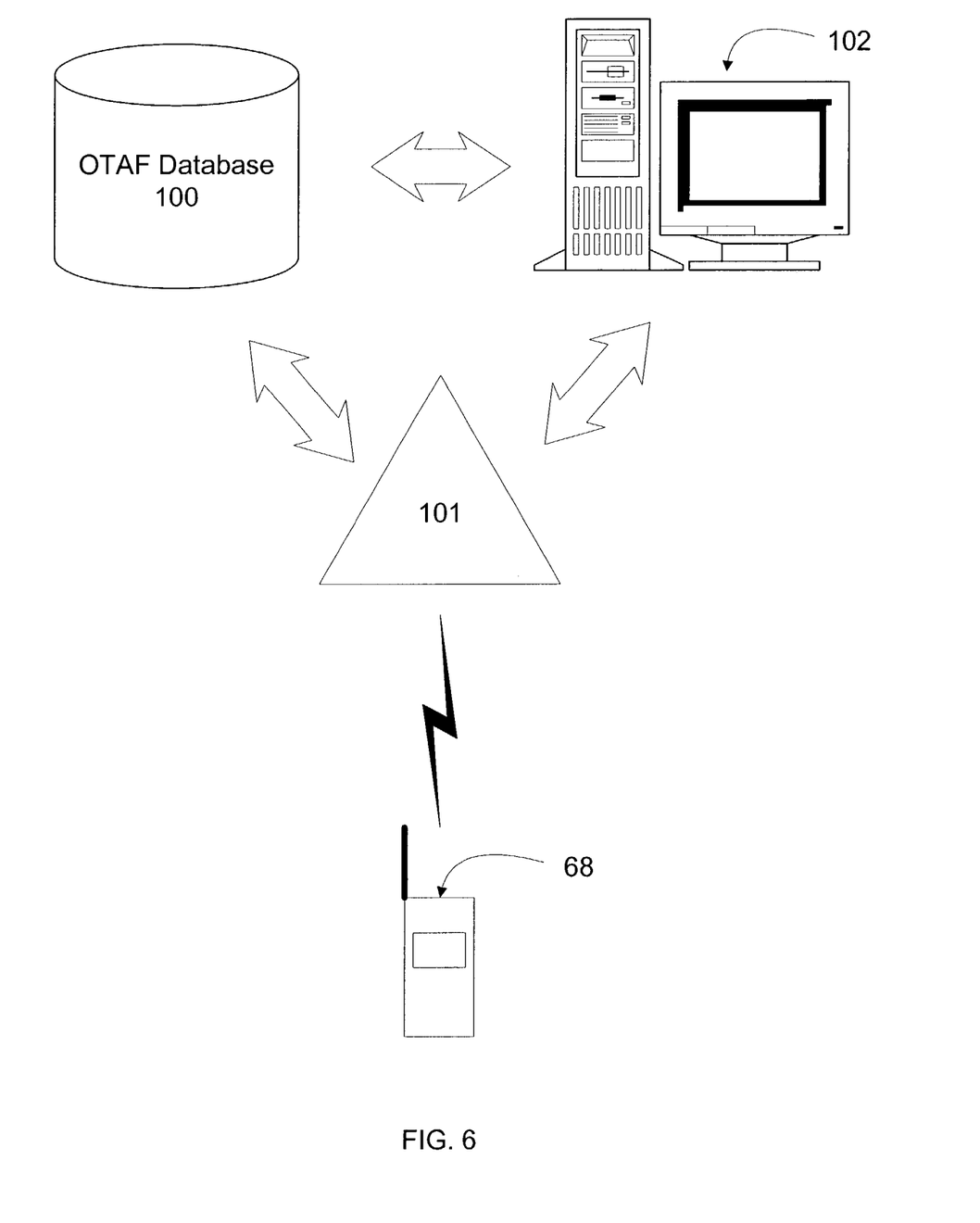
FIG. 6 illustrates, in accordance with an aspect of the present invention, an exemplary mobile station and wireless network.

FIG. 6 illustrates a top level architecture or arrangement for the network based cellular locator feature downloading using Over-the-Air Activation (OAA) and Over-the-Air Programming (OAP). As shown in FIG. 6, an application referred to as an Over-the-Air Activation Function (OTAF) 100 is stored at an external platform. The OTAF 100 may be implemented with software or programmed logic, and be adapted to perform the various functions described herein. The OTAF 100 may be provided together with a database. The platform at which the OTAF 100 and database are provided may be a special purpose platform or may be incorporated into an existing platform, such as a Short Message Service Center (message center), a local switch, a Home Location Register (HLR), or a Service Control Point (SCP) of an Advanced Intelligent Network (AIN).

In order to perform administrative functions on the database of the OTAF 100, including populating and/or modifying network based cellular locator feature entries in the database, a database administration access mechanism 101 may be provided. The database administration access mechanism 101 may be provided locally or remotely from the OTAF 100 and may be controlled and operated by a human operator. For example, the database administration mechanism 101 may include an operator terminal provided at the customer service center 102 (CSC). In addition, the database administration access mechanism 101 may include any known type of input source. Exemplary access schemes into the OTAF 100 include: (1) an OTAF platform administrative terminal, (2) a TCP/IP feed directly from the customer service center 102 (CSC), and (3) a dial-up modem connection from a remote facility. The information can input via the Short Message Peer-to-Peer (SMPP) protocol which runs over TCP/IP.

In accordance with an aspect of the invention, the database of the OTAF 100 may also maintain a subscriber database of all active mobile stations that are capable of receiving the network based cellular mobile station locator feature 67. The subscriber database may be generated by the customer service center (CSC) 102 and provided as input to the OTAF 100. When a customer activates (or reactivates) a mobile station 68, the CSC 102 enters a subscriber profile into the subscriber database. From this subscriber database, the OTAF 100 is able to generate and send out code for implementing the network based cellular mobile station locator feature 67 to each eligible mobile station 68 on record.

More particularly, according to an aspect of the invention, the network based cellular locator feature may be downloaded to each mobile station 68 in accordance with the following procedure. When a subscriber calls the customer service center (CSC) 102 to activate a mobile station 68, the CSC 102 representative assigns a MIN for the mobile station 68 and identifies the features to which the subscriber is allowed. The network based cellular locator feature 67 can be downloaded with other OTAF information similar to that for new activations. Similarly, in reprogramming, general parameters are downloaded into the mobile station 68 along with the new network based cellular locator feature 67. If none of the parameters have changed, only the updated network based cellular locator feature 67 is downloaded to the mobile station 68.

Figure 7:
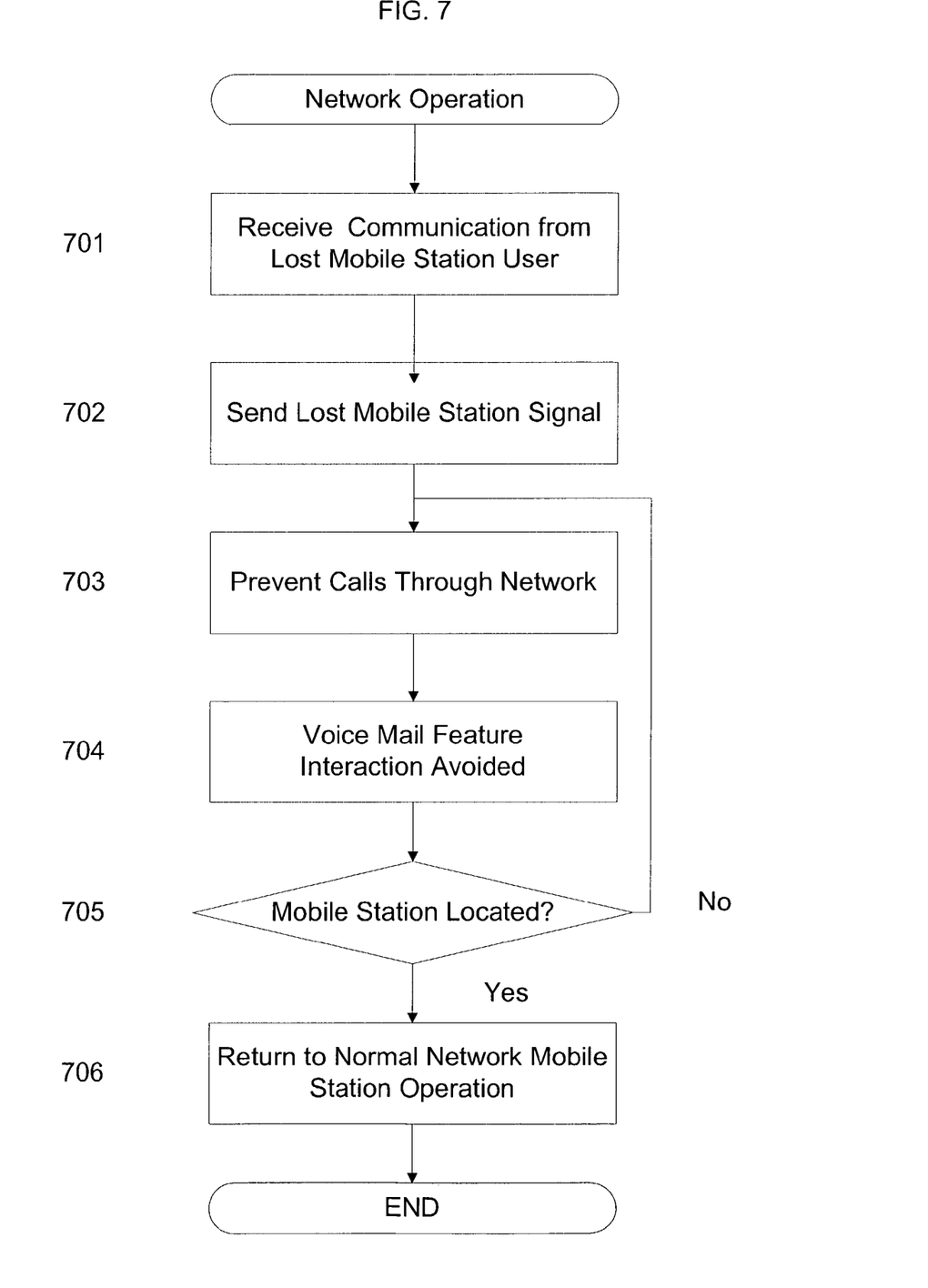
FIG. 7 is a flow diagram of the processes and operations of an aspect of the present invention.

Referring now to FIG. 7, an exemplary logic flow diagram of the operation of the network based cellular mobile station locator of the present invention will be discussed, in accordance with a network aspect of the present invention. Although the description below is made with reference to a cellular network environment, the various processes and operation may also be applied to any other type of wireless communication network.

At step 701 when the user loses his mobile station 68 the user can, as discussed before, inform the network of the situation. Once the network has received the misplaced mobile station message and optionally authenticated the identity of the misplaced mobile station message sender, then the misplaced mobile station signal may be sent. At step 702 the misplaced mobile station signal is then routed through the network. The misplaced mobile station signal will be routed to the appropriate MTSO (54, 58) where it will be transmitted via the appropriate base station (75, 95).

The misplaced mobile station signal can take any one of numerous different formats. The signal can be a text message, data signal, email, call originating from a special number or a SMS message. In one embodiment, the misplaced mobile station signal is a SMS message. The specific form of the message is not critical, as long as the mobile station 68 can determine that the signal is different from other types of signals.

When choosing one of the options for communicating with the mobile station 68, one behavior to be considered is how the communication mechanism functions when the mobile station 68 cannot receive the message. If the mobile station 68 is turned off or out of communications range, the mobile station 68 will not immediately receive the message triggering the lost mobile station mode. The most desirable implementations would trigger the mobile station 68 to enter lost mobile station mode (steps 504–514) as soon as practical once the mobile station 68 was turned on, or came back into range, or otherwise became able to receive the signal. The choice of delivery alternatives will affect the behavior of the feature if the mobile station 68 temporarily cannot receive the delivered signal (because it is off, out of range, etc.). For example, email delivery is traditionally tried repeatedly over several days. Even if no modification of the standard email delivery mechanisms is made, the misplaced mobile station signal is reasonably likely to be delivered at some point. In its usual nature, email delivery is tried repeatedly but not continuously. It would be possible for the mobile station 68 to be turned on and off, brought into and taken out of range, etc., repeatedly—always missing the delivery attempt because of the usual long periods of time (typically an hour or more) between email delivery attempts. In this case it is unlikely that the signal would be delivered immediately (or nearly so) once the mobile station 68 became capable of receiving signals. This might allow a person who found the misplaced mobile station 68 to place a number of outgoing calls before the mobile station 68 was put into lost mobile station mode and outbound calls were blocked (step 513). This disadvantage could be overcome by having the cellular network trigger a sending of the special email as soon as the network notices the mobile station 68 is in range and available.

As a second example, a normal mobile station call is typically only tried once. If a normal mobile station call from a special number is the delivery mechanism chosen, the traditional network would merely fail to complete the call if the mobile station 68 were turned off or out of range, and the lost mobile station feature 67 would not be triggered. As in the email example, though, the disadvantage can be overcome by triggering the mobile station call to be placed as soon as the network notices the mobile station 68 is in range and available.

In step 703, the use of the mobile station 68 may be optionally locked by the network. The locking of the mobile station 68 can be with respect to either incoming calls, outgoing calls or both. In one embodiment, after the misplaced mobile station signal is received, no other transmission is received or transmitted with the transceiver 63. This can reduce energy consumption and hence increase battery life.

With respect to step 704, the voice mail feature of the network is avoided while the misplaced mobile station signal is sent. In other words, the network will send the signal to put the misplaced mobile station into lost mode by ringing the misplaced mobile station 68, but not let the voice mail feature stop the ringing until the mobile station has recognized the incoming call as a misplaced mobile station signal, even if the signal is a 'normal' voice call from a special number. Voice mail would never be invoked in the delivery of any of the other non-voice mechanisms described (text message, data signal, email, SMS message). In one embodiment, a Short Message Service (SMS) misplaced mobile station signal is sent and thus will not interact with the network voice mail feature and thereafter avoid the voice mail altogether.

At step 705, when the phone is found by the user, the network may be contacted to allow normal phone operations. Contact can be accomplished in one of many ways. The owner can call, email, or visit a website that communicates directly or indirectly with the network and/or customer service center 102. This communication can include some level of security that includes a Personal Identification Number (PIN), password, account number, or other identifying information. At step 706 the network will then allow the mobile station 68 to return to normal operation.

A specific example of the mobile station 68 and network will now be described. In this example, the mobile station 68 is implemented as a cellular handset having the above described algorithm implemented as firmware 67 that has been installed in the factory during manufacture of the handset.

When the user loses his mobile station 68, he calls a single common phone number that is part of the customer service center 102. This phone number will connect the user to a interactive voice response system that queries the user to provide identifying information to the system. Once the call is successfully completed, the user can then hang-up and wait for the handset to ring.

The network, at the same time that the user contacts the customer service center, will block any calls placed by the handset other than calls to the customer service center 102. All calls that are made to that user's phone 68 will also be blocked and transferred directly to voice mail. All other messages (text messages, data signals, email, SMS messages) will also be stored or discarded as appropriate, but not delivered to the misplaced mobile station.

The network after receiving the phone call from the misplaced handset user will initiate a misplaced phone signal. In this example, the misplaced phone signal is a Short Message Service (SMS) signal that contains the following data <* LOST PHONE*>. This misplaced phone signal will flow through the network, through the appropriate Mobile Telephone Switching Office (MTSO) 24, 28 and be transmitted from the appropriate base station 30, 40. Because the signal is a SMS message, the misplaced phone signal will not interact with the voice mail feature of the network.

Next the mobile station 68 will receive the misplaced phone signal through the antenna 62 and transceiver 63. The signal will then be interrogated to see if it is a misplaced phone signal by the control system 61. The control system 61 will compare the SMS message to see if it corresponds to <* LOST PHONE*>. In this example the control system 61 recognizes the SMS message as <* LOST PHONE*> and thus causes the speaker 64 to ring at high volume, overriding the default setting. In this example the handset had been previously been set to silent/vibrate mode and this setting is overridden. At the same time the display 65 will be driven by the control system to display a message on the display. The displayed message will be "This phone has been lost. Please dial (703) 555-1234 and press send." This phone number would correspond to the customer service center. The personnel at the customer service center 102 would be trained to receive such calls and would provide instructions and/or help with returning the misplaced phone 68 to the owner.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for air interfaces and network transmissions (e.g., TDMA, CDMA, PCS, IDEN, PACS, GSM) represent examples of the state of the art. Such standards are periodically superseded by faster or more efficient equivalents having essentially the same functions. Accordingly, replacement standards and protocols having the same functions are considered equivalents.

We claim:

1. A mobile station with a network based cellular mobile station locator feature comprising:
    a transceiver for receiving at least cellular communications and misplaced mobile station signals;
    a speaker;
    a display;
    a keypad;
    a control system for ringing the speaker at high volume when the transceiver receives a misplaced mobile station signal; and
    a storage that stores an indicator indicating the misplaced mobile station signal has been previously received, the mobile station directly entering a lost phone mode upon powering up when the indicator is present in the storage.

2. The mobile station with the network based cellular mobile station locator feature of claim 1 in which:
    said control system further displays a message on the display when the transceiver receives the misplaced mobile station signal.

3. The mobile station with the network based cellular mobile station locator feature of claim 1 in which:
    said control system further prevents the transceiver from at least one of receiving and transmitting cellular communications when the transceiver receives the misplaced mobile station signal.

4. The mobile station with the network based cellular mobile station locator feature of claim 3 in which:
    said control system further allows the transceiver to receive and transmit cellular communications after a personal identification number (PIN) in entered into the keypad.

5. The mobile station with the network based cellular mobile station locator feature of claim 1 in which:
    said control system further operates the speaker to emit an audio message in addition to the speaker ringing.

6. The mobile station with the network based cellular mobile station locator feature of claim 1 in which:
    said control system stops operating the speaker after a key on the keypad is pressed.

7. The mobile station with the network based cellular mobile station locator feature of claim 1 in which:
    said control system further stops operating the speaker after one of a predetermined time elapses and battery level has been reached.

8. A method for locating a misplaced mobile station comprising:
    receiving a misplaced mobile station signal at the misplaced mobile station while avoiding operation of a voice mail feature of the network, the misplaced mobile station signal comprising one of a short message service (SMS) message, an email, and a text message; and
    ringing the misplaced mobile station at a high volume.

9. The method of operating the wireless network for locating the misplaced mobile station according to claim 8 further comprising:
    displaying a message on a display of the mobile station.

10. The method of operating the wireless network for locating the misplaced mobile station according to claim 8 further comprising:
    preventing communications from or to the mobile station at a network level.

11. The method of operating the wireless network for locating the misplaced mobile station according to claim 8 further comprising:
    in addition to the speaker ringing, playing an audio message on the mobile station indicating that the mobile station is misplaced.

12. The method of operating wireless network for locating the misplaced mobile station according to claim 9 wherein the message on the display provides instructions for at least one of returning the mobile station and contacting customer service.

13. The method of operating the wireless network for locating the misplaced mobile station according to claim 8 further comprising:
    stopping the ringing when a personal identification number (PIN) is communicated to the network.

14. The method of operating the wireless network for locating the misplaced mobile station according to claim 8 further comprising:
    stopping the ringing after attaining one of a predetermined time and battery level.

15. A wireless network system comprising:
    a network for initiating communication signals and initiating at least one misplaced mobile station signal, the misplaced mobile station signal comprising one of a short message service (SMS) message, an email, and a text message; and
    a base station for transmitting the communication signals and transmitting the at least one misplaced mobile station signal to a mobile station;
    wherein transmitting the at least one misplaced mobile station signal bypasses a network voice mail feature.

16. The wireless network system of claim 15 in which:
    the base station further transmits the at least one misplaced mobile station signal to display a message on a display of the mobile station.

17. The wireless network system of claim 15 in which: at least one of the network and the base station further prevent mobile station calls from being made to or from the mobile station after transmitting the at least one misplaced mobile station signal.

18. The wireless network system of claim 15 in which:
    the base station further transmits the at least one misplaced mobile station signal to play an audio message at a mobile station, in addition to generating a loud ringing at the mobile station.

19. The wireless network system of claim 17 in which:
    the base station further transmits the at least one misplaced mobile station signal to display the message on the display to provide instructions for one of returning the mobile station and contacting customer service.

20. The wireless network system of claim 15 in which:
    the base station further transmits the at least one misplaced mobile station signal to ring a misplaced mobile station at a high volume.

* * * * *